(12) United States Patent
Ichigozaki et al.

(10) Patent No.: US 11,901,118 B2
(45) Date of Patent: Feb. 13, 2024

(54) METHOD FOR MANUFACTURING HALBACH MAGNET ARRAY AND HALBACH MAGNET ARRAY

(71) Applicant: TOYOTA JIDOSHA KABUSHIKI KAISHA, Toyota (JP)

(72) Inventors: Daisuke Ichigozaki, Toyota (JP); Yuhei Asano, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 57 days.

(21) Appl. No.: 17/806,791

(22) Filed: Jun. 14, 2022

(65) Prior Publication Data

US 2023/0050342 A1    Feb. 16, 2023

(30) Foreign Application Priority Data

Jul. 27, 2021 (JP) .................................. 2021-122375

(51) Int. Cl.
*H01F 7/02* (2006.01)
*H02K 41/03* (2006.01)

(52) U.S. Cl.
CPC .......... *H01F 7/021* (2013.01); *H01F 7/0205* (2013.01); *H02K 41/031* (2013.01); *H02K 2213/03* (2013.01)

(58) Field of Classification Search
CPC .. H02K 41/031; H02K 2213/03; H02K 15/03; H01F 7/0205; H01F 7/021
See application file for complete search history.

(56) References Cited

FOREIGN PATENT DOCUMENTS

| JP | 2018092988 A | 6/2018 | | |
|---|---|---|---|---|
| KR | 840002384 B1 | * | 12/1984 | ................ B22F 3/24 |
| WO | WO-2018216805 A1 | * | 11/2018 | ................ B22F 3/24 |

* cited by examiner

*Primary Examiner* — Mohamad A Musleh
(74) *Attorney, Agent, or Firm* — Dickinson Wright, PLLC

(57) ABSTRACT

The method for manufacturing the Halbach magnet array comprises a) magnetizing at least one first magnetic material piece and at least one second magnetic material piece in a direction parallel to a first direction, and b) magnetizing a third magnetic material piece in a direction parallel to a second direction perpendicular to the first direction, in this order. The first magnetic material piece and the second magnetic material piece are alternately arranged in the second direction with the third magnetic material piece interposed therebetween. The first magnetic material piece adheres to the adjacent third magnetic material piece via a non-magnetic layer with a thickness t1, the second magnetic material piece adhere to the adjacent third magnetic material piece via a non-magnetic layer with a thickness t2, and t1 and t2 satisfy a formula t1<t2.

6 Claims, 5 Drawing Sheets

METHOD FOR MANUFACTURING HALBACH MAGNET ARRAY AND HALBACH MAGNET ARRAY

CROSS REFERENCE TO RELATED APPLICATIONS

The present application claims priority from Japanese patent application JP 2021-122375 filed on Jul. 27, 2021, the entire content of which is hereby incorporated by reference into this application.

BACKGROUND

Technical Field

The present disclosure relates to a method for manufacturing a Halbach magnet array and a Halbach magnet array.

Background Art

JP 2018-092988 A discloses a Halbach magnetic circuit that includes a plurality of permanent magnets having a plurality of regions magnetized in directions different from one another.

As illustrated in FIG. 1, the Halbach magnetic circuit 120 generally includes a plurality of permanent magnets 101 arranged in one direction, and adjacent permanent magnets 101 have magnetized directions forming a predetermined angle (for example, 90°). Such an arrangement provides a higher surface magnetic-flux density at a surface (a front surface) of the Halbach magnetic circuit 120 and a lower surface magnetic-flux density or ideally have zero surface magnetic-flux density at an opposite surface (a back surface) of the Halbach magnetic circuit 120.

SUMMARY

When a Halbach magnetic circuit is manufactured by integrating a plurality of magnetized magnets together, repulsion between the magnets makes it difficult to accurately control the positions of the magnets, thereby requiring a large external force. Therefore, such a manufacturing method is not suitable for a mass-producing process. Meanwhile, a Halbach magnetic circuit manufactured by integrating a plurality of unmagnetized magnetic materials together followed by magnetizing each of the magnetic materials in a predetermined direction or by forming a plurality of regions magnetized in different directions from one another in one permanent magnet as illustrated in JP 2018-092988 A tends to have small ratio of a magnetic-flux density of the front surface to that of the back surface.

Therefore, the present disclosure provides a method that allows an easy manufacture of a Halbach magnet array having a large ratio of a magnetic-flux density at a front surface to a magnetic-flux density at a back surface, and a Halbach magnet array manufactured thereby.

According to one aspect of the present disclosure, there is provided a method for manufacturing a Halbach magnet array, the method comprising in this order:

a) magnetizing at least one first magnetic material piece and at least one second magnetic material piece in a direction parallel to a first direction,
wherein the at least one first magnetic material piece and the at least one second magnetic material piece are alternately arranged in a second direction perpendicular to the first direction with a third magnetic material piece interposed therebetween,
wherein each of the at least one first magnetic material piece adheres to the adjacent third magnetic material piece via a non-magnetic layer with a thickness t1,
wherein each of the at least one second magnetic material piece adheres to the adjacent third magnetic material piece via a non-magnetic layer with a thickness t2,
wherein the thickness t1 and the thickness t2 satisfy a formula t1<t2,
wherein the at least one first magnetic material piece and the at least one second magnetic material piece have easy axes of magnetization parallel to the first direction,
wherein the third magnetic material piece has an easy axis of magnetization parallel to the second direction, and
wherein the direction of magnetizing the at least one first magnetic material piece is different from the direction of magnetizing the at least one second magnetic material piece by 180°, and b) magnetizing the third magnetic material piece in a direction parallel to the second direction such that the third magnetic material piece has a south pole opposed to the adjacent first magnetic material piece and a north pole opposed to the adjacent second magnetic material piece.

According to one aspect of the present disclosure, there is provided a Halbach magnet array comprising:

at least one first magnetic material piece having magnetization in a direction parallel to a first direction;
at least one second magnetic material piece having magnetization in a direction different by 180° from the direction of the magnetization of the first magnetic material piece; and
at least one third magnetic material piece having magnetization in a direction parallel to a second direction perpendicular to the first direction,
wherein the at least one first magnetic material piece and the at least one second magnetic material piece are alternately arranged in the second direction with the third magnetic material piece interposed therebetween,
wherein the third magnetic material piece has a south pole opposed to the adjacent first magnetic material piece and a north pole opposed to the adjacent second magnetic material piece,
wherein each of the at least one first magnetic material piece adheres to the adjacent third magnetic material piece via a non-magnetic layer with a thickness t1,
wherein each of the at least one second magnetic material piece adheres to the adjacent third magnetic material piece via a non-magnetic layer with a thickness t2, and
wherein the thickness t1 and the thickness t2 satisfy a formula t1<t2.

A manufacturing method according to the present disclosure allows an easy manufacture of a Halbach magnet array having a large ratio of a magnetic-flux density at a front surface to a magnetic-flux density at a back surface.

DETAILED DESCRIPTION

Figure 1:
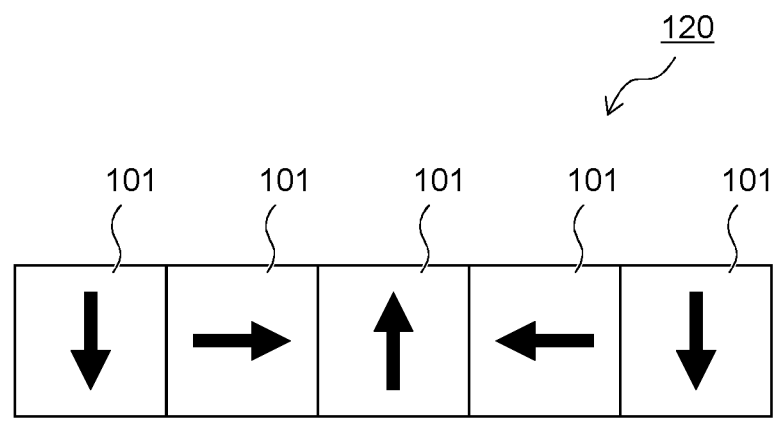
FIG. 1 is a drawing schematically illustrating a conventional exemplary Halbach magnet circuit.
Figure 1:
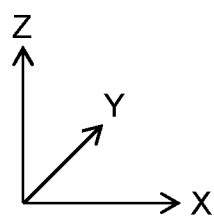

The following describes embodiments with reference to the drawings as necessary. The present disclosure is not limited to the following embodiments, and the design may be modified variously without departing from the spirits of the present invention described in the claims. Note that, in the drawings referred in the following description, the same reference numerals are attached to the same members or members having similar functions and the repeated descriptions are omitted in some cases. The drawings have dimensional proportions that may be different from the actual proportions for convenience of explanation, and parts of a member may be omitted from the drawing. In the application, a numerical range represented using a sign "-" includes respective numerical values written before and after the sign "-" as a lower limit value and an upper limit value. In the application, "perpendicular" includes substantially perpendicular, and "parallel" includes substantially parallel.

Figure 2:
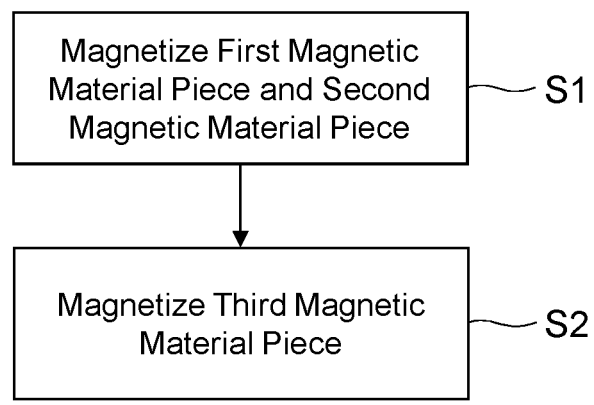
FIG. 2 is a flowchart of a manufacturing method according to an embodiment.

A method for manufacturing a Halbach magnet array includes, as illustrated in FIG. 2, a step (S1) of magnetizing a first magnetic material piece and a second magnetic material piece, and a step (S2) of magnetizing a third magnetic material piece.

a) Magnetization of First Magnetic Material Piece and Second Magnetic Material Piece First, at least one unmagnetized first magnetic material piece, at least one unmagnetized second magnetic material piece, and at least one unmagnetized third magnetic material piece are prepared. The first magnetic material piece, the second magnetic material piece, and the third magnetic material piece each include a permanent magnet material. Examples of the permanent magnet material include an Nd—Fe—B-based magnet material, an Sm—Co-based magnet material, an Sm—Fe—N-based magnet material, a ferrite-based magnet material, and an Al—Ni—Co-based magnet material. The first magnetic material piece, the second magnetic material piece, and the third magnetic material piece have a magnetic anisotropy. That is, the first magnetic material piece, the second magnetic material piece, and the third magnetic material piece each have an easy axis and a hard axis of magnetization. The first magnetic material piece, the second magnetic material piece, and the third magnetic material piece may have any shapes. Each magnetic material piece may have, for example, a columnar shape having an approximately rectangular-shaped (especially an approximately square-shaped) or an approximately partial circular ring-shaped bottom surface. Further, the first magnetic material piece, the second magnetic material piece, and the third magnetic material piece may have the same shape and dimension. When the first magnetic material piece, the second magnetic material piece, and the third magnetic material piece have a columnar shape having an approximately rectangular-shaped bottom surface (that is, a cuboidal shape) of the same dimension, the easy axes of the first magnetic material piece and the second magnetic material piece may be perpendicular to a pair of surfaces parallel to one another among surfaces perpendicular to the bottom surface, and the easy axis of the third magnetic material piece may be perpendicular to another pair of surfaces parallel to one another among surfaces perpendicular to the bottom surface. When the first magnetic material piece, the second magnetic material piece, and the third magnetic material piece have a columnar shape having an approximately partial circular ring-shaped bottom surface of the same dimension, the easy axes of the first magnetic material piece and the second magnetic material piece may be parallel to a radial direction of the partial circular ring, and the easy axis of the third magnetic material piece may be parallel to a circumferential direction of the partial circular ring. The first magnetic material piece, the second magnetic material piece, and the third magnetic material piece can be manufactured by a generally known manufacturing method. As the first magnetic material piece, the second magnetic material piece, and the third magnetic material piece, commercially available magnetic material pieces may be used.

Figure 3:
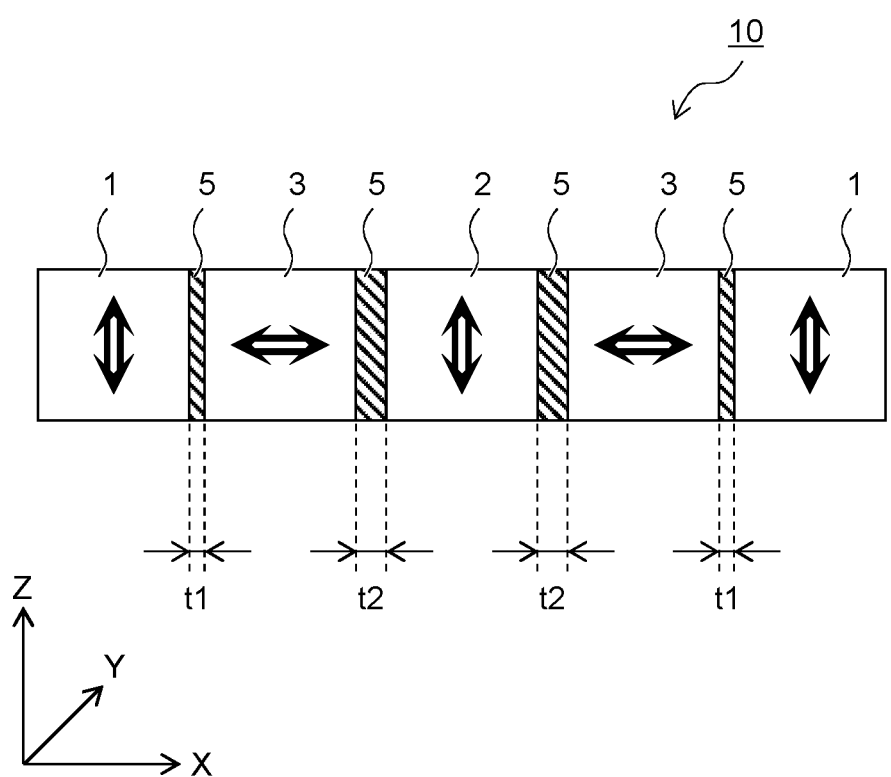
FIG. 3 is a drawing schematically illustrating an exemplary array subjected to a step of magnetizing a first magnetic material piece.

As illustrated in FIG. 3, first magnetic material pieces 1, a second magnetic material piece 2, and third magnetic material pieces 3 are arranged or aligned in a predetermined direction (X direction in FIG. 3) to form an array 10. While a linear array 10 is illustrated in FIG. 3, when the first magnetic material pieces 1, the second magnetic material piece 2, and the third magnetic material pieces 3 have a columnar shape having an approximately partial circular ring-shaped bottom surface, a predetermined number of the first magnetic material pieces 1, the second magnetic material piece 2, and the third magnetic material pieces 3 can be arranged in a circumferential direction to form a circular ring shaped array 10. In the array 10, the first magnetic material pieces 1 and the second magnetic material piece 2 are alternately arranged with the third magnetic material piece 3 interposed between the magnetic material piece 1 and the second magnetic material piece 2. Each of the first magnetic material pieces 1 adheres to the adjacent third magnetic material piece 3 via a non-magnetic layer 5 with a thickness t1, the second magnetic material piece 2 adheres to the adjacent third magnetic material pieces 3 via non-magnetic layers 5 with thicknesses t2, and a formula t1<t2 is satisfied. The non-magnetic layers 5 may include an adhesive agent (for example, an epoxy resin-based adhesive agent and an acrylic resin-based adhesive agent).

The non-magnetic layers 5 may have thermal conductivities of 0.5 W/m·K or below, especially 0.2 W/m·K or below. When the first magnetic material pieces 1 and the second magnetic material piece 2 are magnetized under a condition in which the first magnetic material pieces 1 and the second magnetic material piece 2 have temperatures higher than that of the third magnetic material pieces 3, the non-magnetic layers 5 having the above-described thermal conductivities reduce heat transfer from the first magnetic material pieces 1 and the second magnetic material piece 2 to the third magnetic material pieces 3. This results in effective control of magnetization of the third magnetic material pieces 3 by the magnetic field for magnetizing the first magnetic material pieces 1 and the second magnetic material piece 2. Similarly, in the subsequent step of magnetizing the third magnetic material pieces 3, when the third magnetic material pieces 3 are magnetized under a condition in which the third magnetic material pieces 3 have temperatures higher than those of the first magnetic material pieces 1 and the second magnetic material piece 2, the non-magnetic layers 5 having the above-described thermal conductivities reduce heat transfer from the third magnetic material pieces 3 to the first magnetic material pieces 1 and the second magnetic material piece 2. This results in effective control of the effect of a magnetic field for magnetizing the third magnetic material pieces 3 on residual magnetizations (remanences) of the first magnetic material pieces 1 and the second magnetic material piece 2 during the magnetization of the third magnetic material pieces 3. Further, the non-magnetic layers 5 typically have thermal conductivities of 0.01 W/m·K or above, but the thermal conductivities are not limited to these.

In FIG. 3, two first magnetic material pieces 1 and one second magnetic material piece 2 are alternately arranged with the third magnetic material piece 3 interposed between the magnetic material piece 1 and the second magnetic material piece 2. However, as long as the first magnetic material piece(s) 1 and the second magnetic material piece(s) 2 can be alternately arranged, the number of the first magnetic material piece(s) 1 included in the array 10 may be more than two or less than two, the number of the second magnetic material piece(s) 2 included in the array 10 may be more than one, and/or the number of the third magnetic material piece(s) 3 included in the array 10 may be more than two or less than two.

In the array 10, the easy axes of the first magnetic material pieces 1 and the second magnetic material piece 2 (represented by void arrows in FIG. 3) are parallel to a first direction (Z-direction in FIG. 3) and the easy axes of the third magnetic material pieces 3 (represented by void arrows in FIG. 3) are parallel to a second direction (X-direction in FIG. 3). Here, the first direction and the second direction are perpendicular to one another. The second direction is parallel to the arrangement direction of the first magnetic material pieces 1, the second magnetic material piece 2, and the third magnetic material pieces 3.

Next, the first magnetic material pieces 1 and the second magnetic material piece 2 in the array 10 are magnetized in a direction parallel to the first direction. The directions of magnetizing the first magnetic material pieces 1 are different from the direction of magnetizing the second magnetic material piece 2 by 180°.

The first magnetic material pieces 1 and the second magnetic material piece 2 can be magnetized using any magnetizer. For example, the first magnetic material pieces 1 and the second magnetic material piece 2 can be magnetized by placing the first magnetic material pieces 1 and the second magnetic material piece 2 in a magnetic field (an external magnetic field) generated by a magnetizing yoke.

The first magnetic material pieces 1 and the second magnetic material piece 2 may be magnetized under a condition in which the first magnetic material pieces 1 and the second magnetic material piece 2 have temperatures higher than the third magnetic material pieces 3. This allows providing sufficiently large residual magnetizations to the first magnetic material pieces 1 and the second magnetic material piece 2 while controlling or preventing magnetization of the third magnetic material pieces 3 by the magnetic field for magnetizing the first magnetic material pieces 1 and the second magnetic material piece 2. This is because, the higher the temperature of the magnetic material piece is when being magnetized, the higher a residual magnetization ratio (that is, a ratio of the residual magnetization to a saturated residual magnetization) of the magnetic material piece generally becomes. A temperature dependence of the residual magnetization ratio of the magnetic material piece generally depends on a kind of a magnet material contained as the main component in the magnetic material piece, presence or absence of element substitution and a kind of a substitution element in the magnet material, a structure (for example, a crystal grain size) of the magnetic material piece, and the like.

For example, the first magnetic material pieces 1 and the second magnetic material piece 2 may be magnetized while the first magnetic material pieces 1 and the second magnetic material piece 2 are being heated. In addition to or instead of that, the first magnetic material pieces 1 and the second magnetic material piece 2 may be magnetized while the third magnetic material pieces 3 are being cooled. The first magnetic material pieces 1 and the second magnetic material piece 2 can be heated using any heating means (for example, a hot plate resistance heater and a rubber heater). The first magnetic material pieces 1 and the second magnetic material piece 2 may be heated and magnetized using a magnetizing yoke with a heater. The third magnetic material pieces 3 can be cooled using any cooling means (for example, a water-cooling block).

b) Magnetization of Third Magnetic Material Piece

Next, the third magnetic material pieces 3 are magnetized such that the third magnetic material pieces 3 each have a south pole (S-pole) opposed to the adjacent first magnetic material piece 1 and a north pole (N-pole) opposed to the adjacent second magnetic material piece 2.

The third magnetic material pieces 3 can be magnetized using any magnetizer. For example, the third magnetic material pieces 3 can be magnetized by placing the third magnetic material pieces 3 in a magnetic field generated by a magnetizing yoke (an external magnetic field).

The third magnetic material pieces 3 may be magnetized under a condition in which the third magnetic material pieces 3 have temperatures higher than those of the first magnetic material pieces 1 and the second magnetic material piece 2. This allows providing sufficiently large residual magnetizations to the third magnetic material pieces 3 while controlling the effect of the magnetic field for magnetizing the third magnetic material pieces 3 on the residual magnetizations of the first magnetic material pieces 1 and the second magnetic material piece 2. For example, the third magnetic material pieces 3 may be magnetized while the third magnetic material pieces 3 are being heated. In addition to or instead of that, the third magnetic material pieces 3 may be magnetized while the first magnetic material pieces 1 and the second magnetic material piece 2 are being cooled. The third magnetic material pieces 3 can be heated using any heating means (for example, a hot plate resistance heater and a rubber heater). The third magnetic material pieces 3 may be heated and magnetized using a magnetizing yoke with a heater. The first magnetic material pieces 1 and the second magnetic material piece 2 can be cooled using any cooling means (for example, a water-cooling block).

Figure 4:
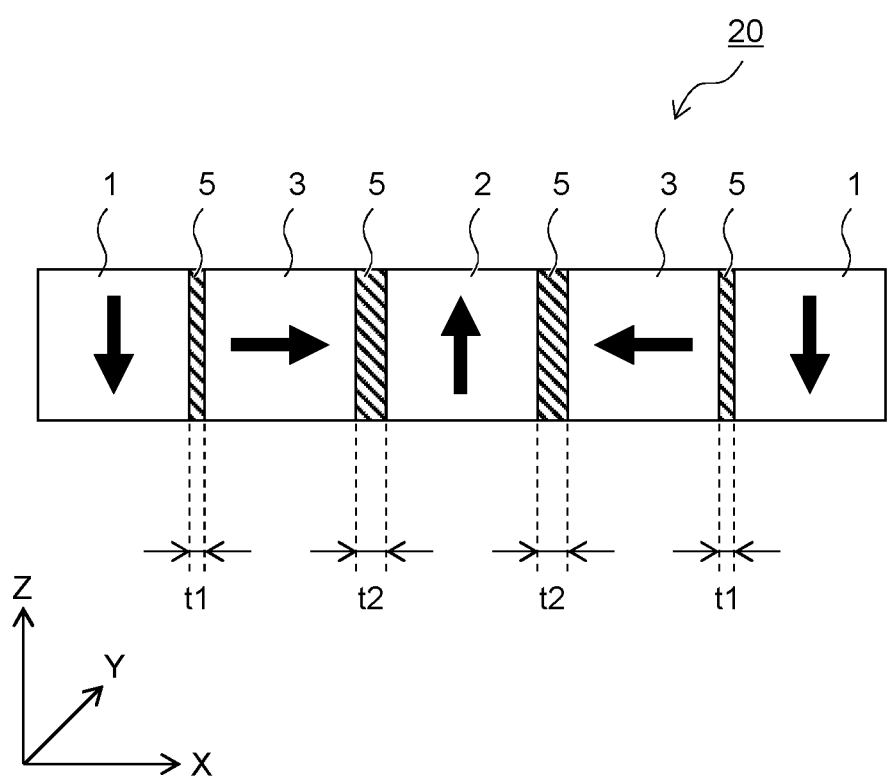
FIG. 4 is a drawing schematically illustrating an exemplary Halbach magnet array manufactured by the manufacturing method according to the embodiment.

As described above, a Halbach magnet array 20 as illustrated in FIG. 4 is manufactured. The Halbach magnet array 20 includes the first magnetic material pieces 1 having magnetization in a direction parallel to a first direction (Z-direction in FIG. 4), the second magnetic material piece 2 having magnetization in a direction different by 180° from the magnetized direction of the first magnetic material pieces 1, and the third magnetic material pieces 3 having magnetization in a direction parallel to a second direction (X-direction in FIG. 4) perpendicular to the first direction. The first magnetic material pieces 1 and the second magnetic material piece 2 are alternately arranged in the second direction with the third magnetic material piece 3 interposed between the magnetic material piece 1 and the second magnetic material piece 2. The third magnetic material pieces 3 each have an S-pole opposed to the adjacent first magnetic material piece 1 and an N-pole opposed to the adjacent second magnetic material piece 2. Each of the first magnetic material pieces 1 adheres to an adjacent third magnetic material piece 3 via the non-magnetic layer 5 with the thickness t1, the second magnetic material piece 2 adheres to the adjacent third magnetic material pieces 3 via the non-magnetic layers 5 with the thickness t2, and the thickness t1 and the thickness t2 satisfy a formula t1<t2.

In the Halbach magnet array 20 obtained by the manufacturing method according to the embodiment, the thickness t2 of the non-magnetic layer 5 between the second magnetic material piece 2 and the third magnetic material piece 3 adjacent to one another is greater than the thickness t1 of the non-magnetic layer 5 between the first magnetic material piece 1 and the third magnetic material piece 3 adjacent to one another. The non-magnetic layers 5 having such thicknesses lead to, as shown in the example described below, a higher ratio of a magnetic-flux density at the front surface to a magnetic-flux density at the back surface of the Halbach magnet array 20. Further, in the manufacturing method of the embodiment, since integration of a plurality of unmagnetized magnetic material pieces is followed by the magnetization of each of the magnetic material pieces in a predetermined direction, the integration of the magnetic material pieces does not suffer from a repulsive force between the magnetic material pieces. Therefore, the integration of the magnetic material pieces does not require a large external force to meet the repulsion force between the magnetic material pieces, and allows the facilitated positioning control of the magnetic material pieces.

EXAMPLES

While the following specifically describes the present disclosure using examples, the present disclosure is not limited to these examples.

Examples 1 and 2, and Comparative Examples 1 to 3

Five magnetic material pieces (neodymium magnet sintered body) having a rectangular parallelepiped shape with a size of 5 mm×5 mm×7 mm and having an easy axis perpendicular to a surface of 5 mm×7 mm were prepared. Among the five magnetic material pieces, two were assigned as first magnetic material pieces, one was assigned as a second magnetic material piece, and two were assigned as third magnetic material pieces.

The first magnetic material pieces and the second magnetic material piece were alternately arranged in a second direction perpendicular to a first direction while the easy axes of the first magnetic material pieces and the second magnetic material piece were parallel to the first direction. The third magnetic material pieces were each arranged between the first magnetic material piece and the second magnetic material piece adjacent to one another while the easy axes of the third magnetic material pieces were parallel to the second direction. The first magnetic material pieces, the second magnetic material piece, and the third magnetic material pieces were arranged such that the surfaces of 5 mm×5 mm of each of the material pieces were parallel to both the first direction and the second direction. A non-magnetic adhesive agent having a thermal conductivity of 0.2 W/m·K was used for attaching the first magnetic material piece to the adjacent third magnetic material piece and the second magnetic material piece to the adjacent third magnetic material piece. Layers of the adhesive agent between the first magnetic material pieces and the third magnetic material pieces had the thicknesses t1 described in Table 1, and layers of the adhesive agent between the second magnetic material piece and the third magnetic material piece and the third magnetic material pieces had the thicknesses t2 described in Table 1. In Table 1, a formula S<M<L is satisfied.

While the first magnetic material pieces and the second magnetic material piece were heated at 65° C., the first magnetic material pieces and the second magnetic material piece were magnetized by an external magnetic field parallel to the first direction. At this time, the magnetizing direction of the first magnetic material pieces was different by 180° from the magnetizing direction of the second magnetic material piece.

Next, while the third magnetic material pieces were heated at 65° C., the third magnetic material pieces were magnetized by an external magnetic field parallel to the second direction such that the third magnetic material pieces had an S-pole opposed to an adjacent first magnetic material piece and an N-pole opposed to an adjacent second magnetic material piece.

Thus, a test piece having a Halbach magnet array arrangement as illustrated in FIG. 4 was obtained.

Comparative Example 4

Five magnetic material pieces (neodymium magnet sintered body) having magnetic anisotropy similar to Example 1 were prepared. Each of the magnetic material pieces was magnetized in a direction of its easy axis. Next, among the five magnetic material pieces, two were assigned as first magnetic material pieces, one was assigned as second magnetic material piece, and two were assigned as the third magnetic material piece, and the five magnetic material pieces were arranged similarly to Example 1. The non-magnetic adhesive agent was used for attaching the first magnetic material piece to the adjacent third magnetic material piece and the second magnetic material piece to the adjacent third magnetic material piece. Layers of the adhesive agent between the first magnetic material pieces and the third magnetic material pieces had the thicknesses t1 described in Table 1, and layers of the adhesive agent between the second magnetic material piece and the third magnetic material pieces had the thicknesses t2 described in Table 1. Thus, a test piece having a Halbach magnet array arrangement illustrated in FIG. 4 was obtained.

TABLE 1

|  | t1 | t2 |
| --- | --- | --- |
| Comparative Example 1 | S | S |
| Example 1 | S | M |
| Example 2 | S | L |
| Comparative Example 2 | M | S |
| Comparative Example 3 | L | L |
| Comparative Example 4 | S | S |

Evaluation

Magnetic fluxes at two surfaces perpendicular to the first direction of each of the test pieces were measured by a flux meter. Among the two surfaces, a surface with a larger magnetic flux was defined as a front surface, and a surface with a smaller magnetic flux was defined as a back surface. A ratio of the magnetic flux at each of the front surface and back surface to sum of the magnetic fluxes at the front surface and the back surface was calculated. The results are shown in FIG. 5.

Figure 5:
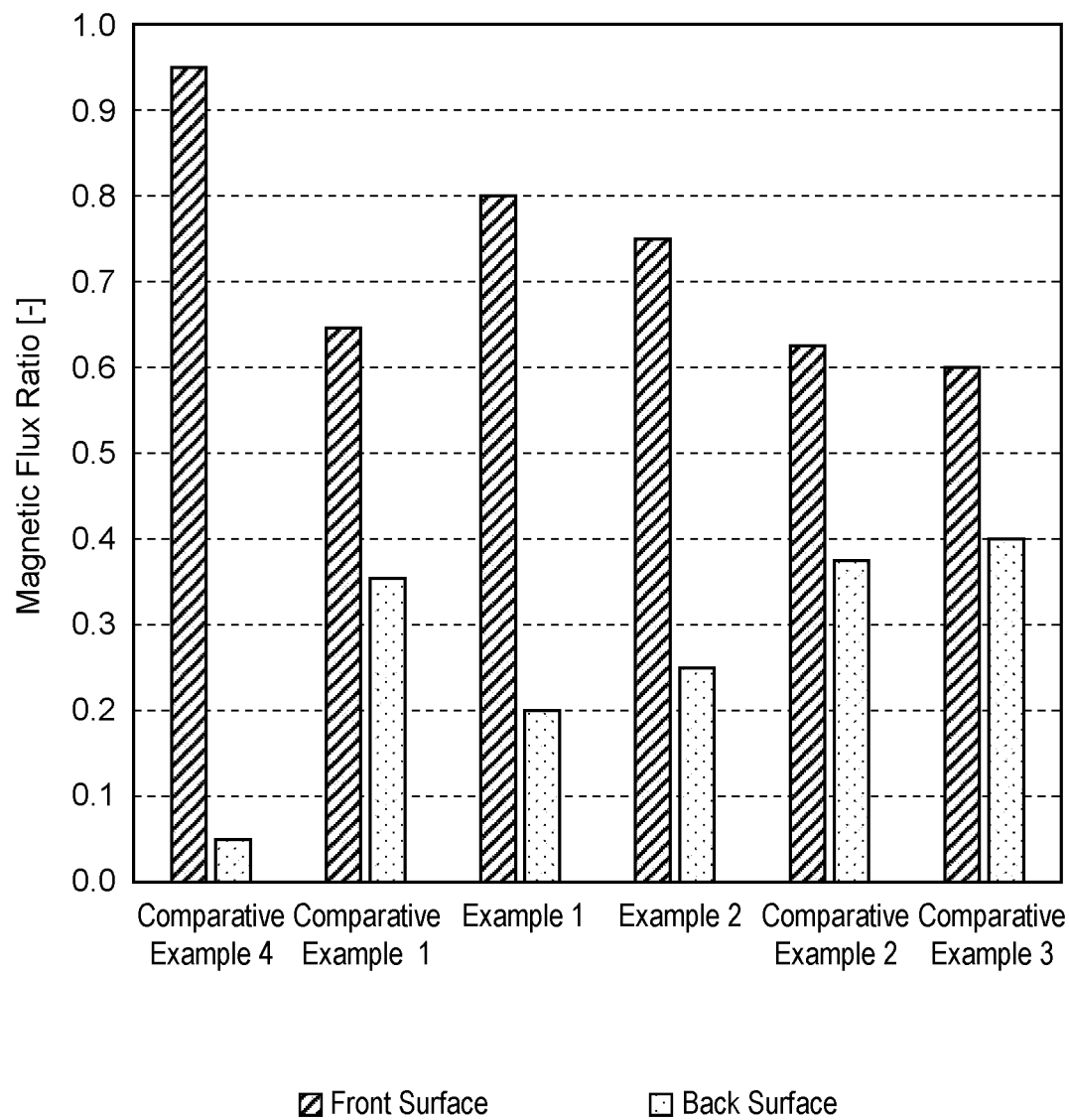
FIG. 5 is a drawing illustrating a ratio of a magnetic flux at a front surface and a ratio of a magnetic flux at a back surface to sum of the magnetic fluxes at the front surface and the back surface of a tested object in each of Examples 1 and 2 and Comparative Examples 1 to 4.

As illustrated in FIG. 5, each of the test pieces of Examples 1 and 2, which satisfied the formula t1<t2, had a ratio of the magnetic flux at the front surface larger than those of the test pieces of the Comparative Examples 1 and 3, which satisfied the formula t1=t2, and the test piece of the Comparative Example 2, which satisfied the formula t1>t2.

Although the ratios of the magnetic fluxes at the front surfaces of the test pieces of Examples 1 and 2 were smaller than the ratio of the magnetic flux at the front surface of the test piece of Comparative Example 4, the method for fabricating the test piece of Comparative Example 4 included integrating the premagnetized material pieces together, which was not suitable for mass production.

What is claimed is:

1. A method for manufacturing a Halbach magnet array, the method comprising in this order:
   a) magnetizing at least one first magnetic material piece and at least one second magnetic material piece in a direction parallel to a first direction,
   wherein the at least one first magnetic material piece and the at least one second magnetic material piece are alternately arranged in a second direction perpendicular to the first direction with a third magnetic material piece interposed therebetween,
   wherein each of the at least one first magnetic material piece adheres to the adjacent third magnetic material piece via a non-magnetic layer with a thickness t1,
   wherein each of the at least one second magnetic material piece adheres to the adjacent third magnetic material piece via a non-magnetic layer with a thickness t2,
   wherein the thickness t1 and the thickness t2 satisfy a formula t1<t2,
   wherein the at least one first magnetic material piece and the at least one second magnetic material piece have easy axes of magnetization parallel to the first direction,
   wherein the third magnetic material piece has an easy axis of magnetization parallel to the second direction, and
   wherein the direction of magnetizing the at least one first magnetic material piece is different from the direction of magnetizing the at least one second magnetic material piece by 180°, and
   b) magnetizing the third magnetic material piece in a direction parallel to the second direction such that the third magnetic material piece has a south pole opposed to the adjacent first magnetic material piece and a north pole opposed to the adjacent second magnetic material piece.

2. The method according to claim 1, wherein the non-magnetic layer has a thermal conductivity of 0.5 W/m·K or below.

3. The method according to claim 1, wherein the non-magnetic layer comprises an adhesive agent.

4. A Halbach magnet array comprising:
   at least one first magnetic material piece having magnetization in a direction parallel to a first direction;
   at least one second magnetic material piece having magnetization in a direction different by 180° from the direction of the magnetization of the first magnetic material piece; and
   at least one third magnetic material piece having magnetization in a direction parallel to a second direction perpendicular to the first direction,
   wherein the at least one first magnetic material piece and the at least one second magnetic material piece are alternately arranged in the second direction with the third magnetic material piece interposed therebetween,
   wherein the third magnetic material piece has a south pole opposed to the adjacent first magnetic material piece and a north pole opposed to the adjacent second magnetic material piece,
   wherein each of the at least one first magnetic material piece adheres to the adjacent third magnetic material piece via a non-magnetic layer with a thickness t1,
   wherein each of the at least one second magnetic material piece adheres to the adjacent third magnetic material piece via a non-magnetic layer with a thickness t2, and
   wherein the thickness t1 and the thickness t2 satisfy a formula t1<t2.

5. The Halbach magnet array according to claim 4, wherein the non-magnetic layer has a thermal conductivity of 0.5 W/m·K or below.

6. The Halbach magnet array according to claim 4, wherein the non-magnetic layer comprises an adhesive agent.

* * * * *